United States Patent [19]

Nagura et al.

[11] Patent Number: 4,473,851
[45] Date of Patent: Sep. 25, 1984

[54] ANALOG MAGNETIC RECORDING SYSTEM FOR BINARY SIGNALS

[75] Inventors: Nobuyoshi Nagura; Taneichi Kawai, both of Anjyo, Japan

[73] Assignee: Aisin Seiki Kabushiki Kaisha, Kariya, Japan

[21] Appl. No.: 350,910

[22] Filed: Feb. 22, 1982

[30] Foreign Application Priority Data

Mar. 5, 1981 [JP] Japan .................................. 56-31633
Mar. 5, 1981 [JP] Japan .................................. 56-31634

[51] Int. Cl.³ .............................................. G11B 5/09
[52] U.S. Cl. ........................................ 360/43; 360/44
[58] Field of Search ....................... 360/40, 43, 44, 45, 360/46

[56] References Cited

U.S. PATENT DOCUMENTS 2,954,267 9/1960 Canepa .................................. 360/40
3,789,139 1/1974 Negishi .................................. 360/40
4,340,913 7/1982 Cave ..................................... 360/40

Primary Examiner—Vincent P. Canney
Attorney, Agent, or Firm—Sughrue, Mion, Zinn, Macpeak & Seas

[57] ABSTRACT

Digital data is recorded onto a cassette tape by utilizing an audio cassette tape recorder under the control by a microprocessor. The microprocessor assigns "0" digital data bit a time sequence of a shorter pulse of a single period ($T_1$) and having a duty cycle of 50% and a longer pulse of a single period ($T_2$) and having a duty cycle of 50%. Assigned to "1" data bit is a time sequence of a single period of $T_2$ pulse and a single period of $T_1$ pulse. An analog signal applied to the recording unit of the audio cassette tape recorder initiates a gradual increase in its level at a point of transition from the low level L to the high level H of either $T_1$ or $T_2$ pulse, and returns to a start level at a point of transition from the H to the L level and also initiates a gradual decrease in the level. In this manner, a waveform conversion is performed. As a result of such waveform conversion, a signal reproduced from the cassette tape has a waveform which can be easily determined to represent either one of the binary data bits. The use of pulses having duty cycles of 50% as reference waves minimizes a level fluctuation in the reproduced signal which may be caused by a time constant of the reproducing unit of the tape recorder.

10 Claims, 21 Drawing Figures

ANALOG MAGNETIC RECORDING SYSTEM FOR BINARY SIGNALS

BACKGROUND OF THE INVENTION

The invention relates to a system for recording and reproducing binary data by utilizing an analog magnetic recording and reproducing apparatus, in particular, to an analog magnetic recording system which may be used in a magnetic recording of binary data as are used in a solid state digital logic processor such as a microprocessor.

An analog magnetic recorder, or so-called audio tape recorder, is extensively offered for use in the recording and the reproduction of conversations, learning services, songs and performance of musical instruments, and is currently popular in home applications. Some of the features of such a recorder are the compactness, the low price and the ease of tape handling.

On the other hand, a variety of equipment and instruments incorporate a varying degree of sophisticated control by utilizing data stored in semiconductor memories of a microcomputer or the like. By way of example, in an electronic sewing machine, the main control comprises a microcomputer or other logic IC to allow a patterned sewing operation in accordance with sewing operation control data stored in a semiconductor memory. Where control data is previously stored in a semiconductor read only memory (ROM), there is a difficulty since the patterns which can be achieved by an automatic sewing operation are limited and cannot be altered. Where a read-write memory (RAM) is used, the data stored is not fixed, but it is necessary to enter sewing operation control data which is read by a card reader or tape reader. Accordingly, a recent practice is to utilize a tape cassette which is commonly used for audio purpose, as a main record medium in which sewing operation control data is previously stored. As the sewing operation proceeds, a given number of blocks of data are read from the cassette tape and written into the RAM, and the data from the RAM is read out to control the sewing operation. See, for example, pending U.S. Patent Application Ser. No. 231,089, filed Feb. 3, 1981. It will be seen that the cassette tape is compact and easy to handle, and by providing the sewing machine with an analog (audio) magnetic recording and reproducing unit, automatic pattern sewing of a high level can be achieved without involving an increased cost and while avoiding an increased size of the overall arrangement.

However, a usual cassette tape recorder or analog magnetic recording and reproducing apparatus cannot produce a playback signal which is in the form of a binary waveform if binary data is recorded. FIG. 1a shows one form of binary signal. The particular binary signal illustrated is adapted to represent signals "0" and "1" by a combination of one period of a pulse having a period of $\frac{1}{2} T_1$ and a duty cycle of 50% (reference binary signal) and one period of a pulse having a period of $T_1$ and a duty cycle of 50% (reference binary signal). In this manner, a time interval of $3/2 T_1$ is assigned to one bit of serial data. However, when such reference binary signals are recorded and reproduced by conventional analog magnetic recording and reproducing apparatus, the playback signal will be greatly distorted as indicated in FIG. 1b, presenting a difficulty in the detection of the pulse width.

Where the content of the originally recorded signal represents a digital signal comprising a succession of "1" bits followed by another digital signal comprising a succession of "0" bits, there occurs a shift in the level of the reproduced signal as indicated in FIG. 1b. In this example, the pulses representing "1" and pulses representing "0" both have an equal period, but a distinction is made therebetween by the respective duty cycles.

SUMMARY OF THE INVENTION

It is a first object of the invention to provide an analog magnetic recording system which achieves a binary data recording in a manner which enables data reproduction in substantially binarized waveform; a second object is to provide an analog magnetic recording system which achieves a binary data recording in a manner enabling the reproduction of a binarized waveform with a reduced level shift; a third object is to provide a digital data magnetic recording and reproducing system utilizing an analog magnetic recording and reproducing apparatus and a magnetic cassette tape, both of which find popular applications in home use; and a fourth object is to provide an analog magnetic recording and reproducing system which simplifies the processing of digital data for recording and simplifies the processing of a reproduced signal for binarization.

The above objects are accomplished in accordance with the invention by shaping a binary signal to be recorded in a manner such that the waveform of a reproduced signal from an analog magnetic recording apparatus exhibits substantially binary waveform. Specifically, when recording and reproducing a binary signal as indicated in FIG. 3a, a binary data recording signal for application to the analog magnetic recording apparatus is formed by initiating a gradual increase in the level at a point $P_1$ of transition from the low to the high level of the binary signal, and returning to a start level at a point $P_2$ of transition from the high to the low level and initiating a gradual decrease in the level, as shown in FIGS. 3b or 3c. FIG. 3b represents a gradual increase or decrease in the form of a linear function while FIG. 3c illustrates a gradual increase or decrease in the form of a sinusoidal function. In FIG. 3c, the zone from the point $P_1$ to the point $P_2$ corresponds to a phase interval from 0 to $\pi/2$ of the sinusoidal wave while the zone extending from the point $P_2$ to the point $P_1$ corresponds to a phase interval from $\pi$ to $3\pi/2$ of another sinusoidal wave.

When the format of the recording signal illustrated in FIG. 3b is applied to bit configurations shown in FIG. 1a, the result is waveforms as indicated in FIG. 4a. When the resulting waveform is recorded in analog form by a magnetic head, there can be produced a playback waveform as shown in FIG. 4b, which is close to a rectangular wave. In FIG. 4b, high frequency ringings HL occur at points of deflection such as $P_1$ or $P_2$. These ringings HL can be filtered out in a simple manner.

By contrast, with the format shown in FIG. 3c which uses sinusoidal waveforms, there is no substantial ringing inasmuch as the change of slope at the points of deflection $P_1$ and $P_2$ is reduced. FIG. 5a shows waveforms which are obtained when the format of FIG. 3c is applied to the bit configurations illustrated in FIG. 1a. When the recorded waveforms of FIG. 5a are reproduced, the resulting playback waveforms will be as shown in FIG. 5b.

In accordance with another aspect of the invention, a signal may be formed for application to the analog magnetic recording apparatus which is formed by initiating a gradual decrease in the level at the point $P_1$ of transition from the low to the high level of the original signal, and returning to the start level at the point $P_2$ where the opposite transition occurs and initiating a gradual increase in the level. In this instance, the reproduced signal will be in the form of an inversion of the original signal.

The investigation revealed that a shift in the level of a reproduced signal as mentioned previously is attributable to the capacitance of a coupling capacitor used in the analog magnetic recording and reproducing apparatus. Specifically, in recording a "1" data bit shown in FIG. 2a, the duration of the high level H is longer than that of the low level L, and hence the voltage remaining across the coupling capacitor increases gradually while simultaneously reducing the energizing current, or the charging current to the coupling capacitor, during the high level H. By contrast, when recording "0" data bit, the reverse is true, and a succession of "0"s causes a gradual increase in the energizing current. In consideration of this fact, in accordance with the invention, the signal being recorded assumes a duty cycle of 50% for either data bit "1" or "0". When the duty cycle of 50% is used, if a succession of either "1"s or "0"s occurs, any charge remaining across the coupling capacitor during the H level is completely discharged during the next following L level, avoiding the occurrence of a level fluctuation.

FIGS. 6a and 6b illustrate the binary signals to be used when recording in accordance with one embodiment of the invention. Specifically, FIG. 6a shows data bit "0" while FIG. 6b shows data bit "1". FIGS. 7a and 7b show corresponding reproduced signals. As shown in FIGS. 7a and 7b, the succession of data bits "0" and the succession of data bits "1" appear to be a like sequence of waveforms as viewed in the time sequence. In this example, in order to simplify the control of a writing operation of a data bit and the processing for the reproduction, representing the period of a shorter pulse by T, a longer pulse has a period of 2T, thus assigning a time interval of 3T to one bit.

Other objects and features of the invention will become apparent from the following description of embodiments thereof with reference to the drawings.

DESCRIPTION OF PREFERRED EMBODIMENTS

Figure 6A:
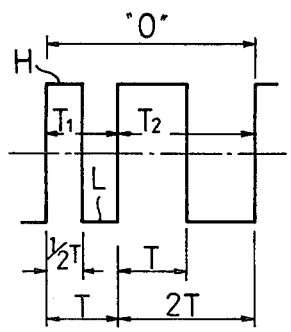
FIGS. 6a and 6b show waveforms of a digital recording signal used in an embodiment of the invention.
Figure 6B:
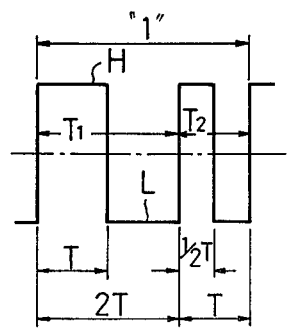
Figure 7A:
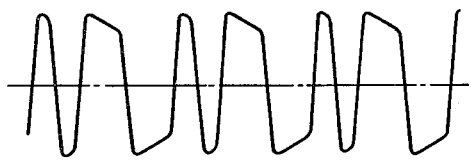
FIGS. 7a and 7b show waveforms of corresponding reproduced signals.
Figure 7B:
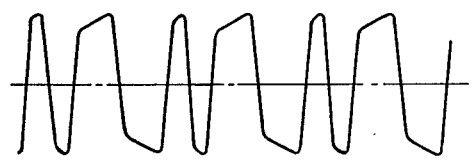
Figure 8:
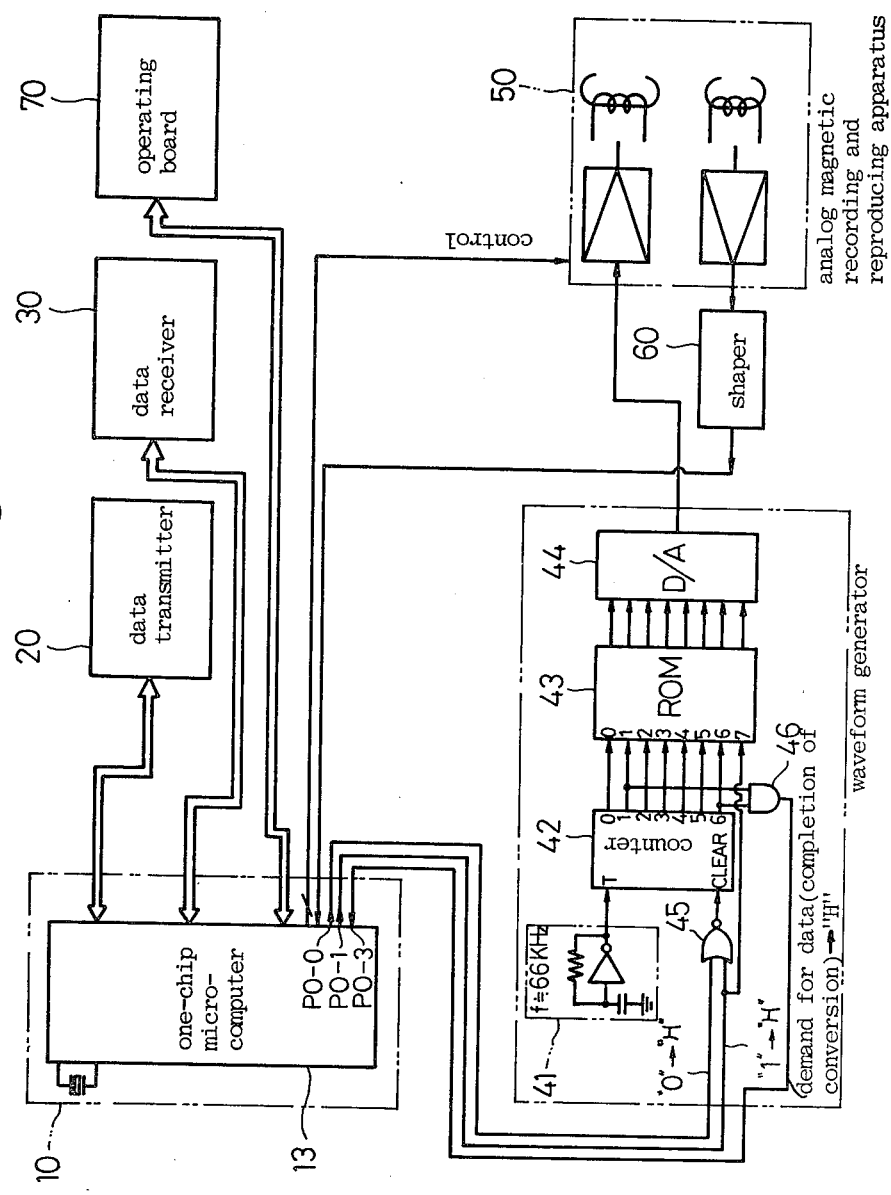
FIG. 8 is a block diagram of an embodiment of the invention.

Referring to FIG. 8, there is shown a digital data processing unit 10 connected to a digital data transmitter 20 representing a source of data to be recorded, and also connected to a data receiver 30 representing a receiving terminal for data being read. The data processing unit 10 is also connected to a waveform generator 40 which is effective to convert a binary signal (see FIGS. 6a and 6b) into a recording signal (see FIGS. 9a and 9b). Additionally, the data processing unit 10 is connected to an analog magnetic recording and reproducing apparatus 50, which is in turn connected to a waveform shaper 60 which operates to shape the waveform of a reproduced signal for conversion into a binary signal. Finally, the data processing unit 10 is also connected to an operating board 70 which includes a plurality of control switches and display elements. By way of example, when the invention is applied to an automatic pattern sewing operation by an electronic sewing machine, the data transmitter 20 may comprise a paper tape reader or a card reader while the data reciever 30 may be omitted. A playback unit within the analog magnetic recording and reproducing apparatus 50 may be omitted. The data read by the data reader 20 is recorded onto an audio cassette tape, which is distributed to a user. The digital data processing unit 10 then comprises a microcomputer which is provided in the sewing machine of the user as a central control unit of the electronic sewing machine. The components 20, 30 shown in FIG. 8 correspond to position sensors, positioning circuit and needle drive control circuit, etc., of a sewing operation control mechanism, and the board 70 corresponds to an operating board of the machine. A recording unit may be omitted from the analog magnetic recording and reproducing apparatus 50. In this sewing machine, the data processing unit 10 reads data from the tape in order to control the various mechanisms of the machine. When a manner of operation is employed in which, during the time the sewing operation is interrupted, the data indicative of the progress of the sewing operation, which is available at the time of interruption as well as other reference data, are recorded so that such data may be referred to upon reinitiation of the sewing operation to allow the sewing operation to be continued on the cloth irrespective of the interruption, the tape may be provided with two tracks, and the apparatus 50 records the data available at the time of interruption, onto the tape. In another manner of operation in which data from a single source (cassette tape) is distributed to a plurality of electronic sewing machines, the data processing unit 10 acts as a control unit which controls the data transfer to the various machines while the components 20 and 30 represent individual sewing machines.

The data processing unit includes a microcomputer 13 which contains a program for converting "1" and "0" data bits into a corresponding recording signal, another program for deciding "1" or "0" data bit in response to a binary signal which is obtained by binarization of a reproduced signal, and a further program which controls other data recording and reproducing operations.

The waveform generator 40 produces data to be recorded onto the cassette tape in a serial form, and begins forming the waveform of one bit in response to the application thereto of a status signal representing a single data bit. Upon completion of forming the one bit waveform, it indicates to this effect to the microcomputer 13, which then responds thereto by applying a next bit status signal ("1" or "0") to the waveform generator 40.

Figure 9A:
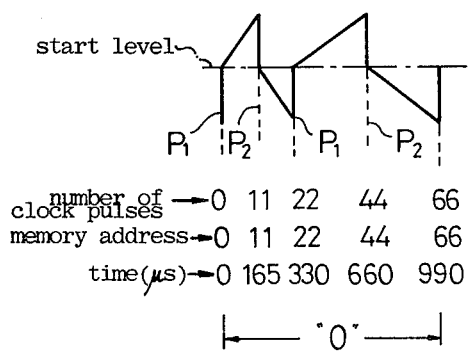
FIGS. 9a and 9b are time charts illustrating other waveforms of recording signals used in the embodiment.
Figure 9B:
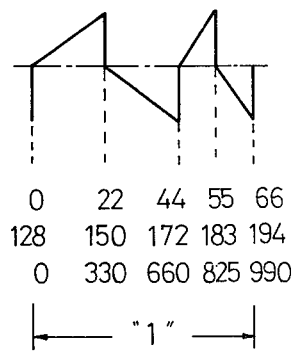

In the present embodiment, the waveform generator 40 comprises a pulse oscillator 41, a counter 42, a semiconductor read only memory (ROM) 43 which stores level data, D/A converter 44, NOR gate 45 and AND gate 46. The microcomputer 13 includes output ports PO-0 and PO-1, each of which is capable of producing a high level H in response to data bit "0" or "1". Thereupon, the output of NOR gate 45 changes from its high level H to its low level L, whereby the clear terminal CLEAR of the counter 42 is enabled for an upcounting operation. In this manner, the counter 42 begins counting up output pulses from the pulse oscillator 41. The signal from the output port PO-1 of the microcomputer 13 is applied to the level data ROM 43 as a data group indicating signal (L: "0" waveform data group, and H: "1" data group). Also, a code indicative of the count in the counter 42 is applied to the ROM 43 as an address at which the data within the group is to be read out. It will be seen that the address to be read out from the ROM 43 is incremented for each count/up operation of the counter 42, thus updating the data which is read out. Specifically, referring to FIGS. 6a and 6b, level data for generating "0" waveform are stored in the ROM 43 at addresses 0–66 while level data for generating "1" waveform are stored therein at addresses 128–194, and the data content experiences a level excursion as indicated in FIGS. 9a and 9b with time or with count.

Figure 1A:
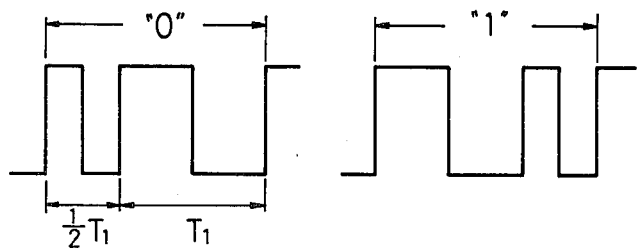
FIG. 1a shows waveforms of one form of binary data.
Figure 1B:
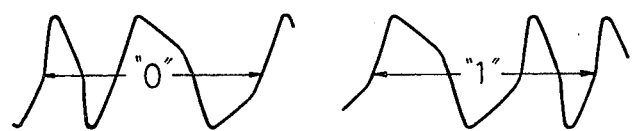
FIG. 1b shows the waveforms of corresponding reproduced signals which are obtained by utilizing a conventional analog magnetic recording and reproducing apparatus.
Figure 2A:
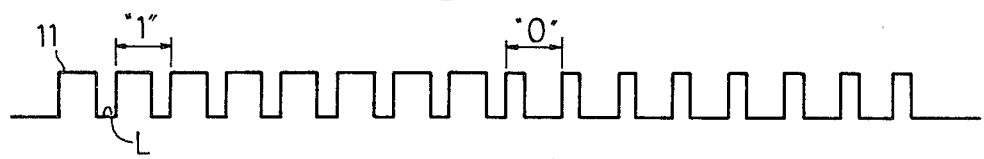
FIG. 2a shows the waveform of a usual digital signal which is applied to an analog magnetic recording and reproducing apparatus.
Figure 2B:
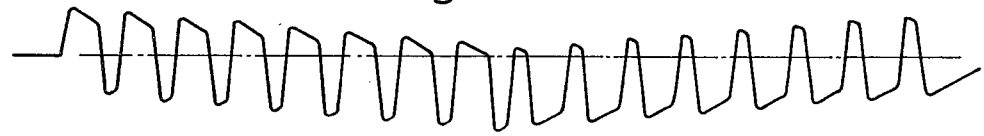
FIG. 2b shows the waveform of a corresponding reproduced signal.
Figure 3A:
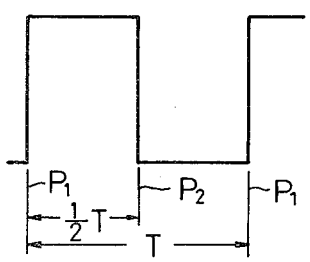
FIG. 3a shows the waveform of the original form of a binary signal.
Figure 3B:
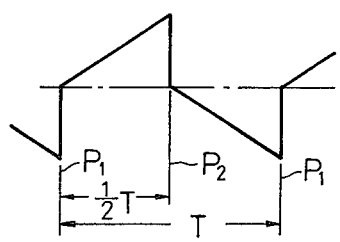
FIGS. 3b and 3c show waveforms of signal forms which are used in accordance with the invention.
Figure 3C:
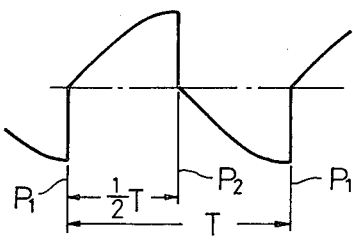
Figure 4A:
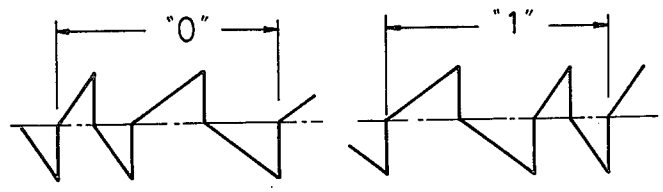
FIG. 4a shows waveforms of signal forms which are used in one embodiment of the invention.
Figure 4B:
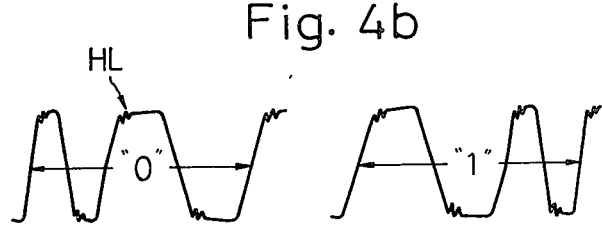
FIG. 4b shows waveforms of corresponding reproduced signals.
Figure 5A:
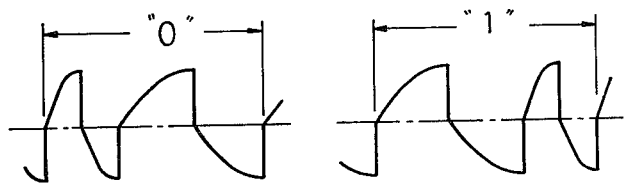
FIG. 5a shows waveforms of different signal forms used in another embodiment of the invention.
Figure 5B:
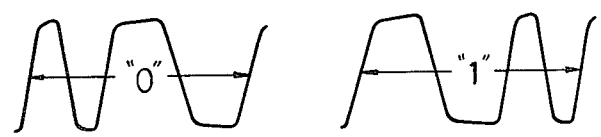
FIG. 5b shows the waveform of corresponding reproduced signals.

When the port PO-1 instructs the generation of "0" waveform, a read-out operation is initiated from the ROM 43 beginning at an address 0 until the code indicative of the count reaches an address 66, whereupon the output from the AND gate 46 changes to its H level, informing the unit 30 the termination of generation of the waveform for one bit. When the port PO-1 instructs the generation of "1" waveform, a read-out operation is initiated at an address $(0+2^7)$ or 128 of the ROM 43 and continues until the code indicative of the count reaches an address of $128+66=194$, whereupon the output from the AND gate 46 changes to its H level, informing the microcomputer 13 the termination of generation of the waveform for one bit. In response to the H level from the AND gate 46, the microcomputer 13 once resets or clears the ports PO-0 and PO-1, followed by applying a renewed H level to the port PO-0 or PO-1 in accordance with the status of data bit "0" or "1" to be recorded next. In the absence of any data which is to be recorded, the both output ports PO-0 and PO-1 are reset. When these ports are reset, the NOR gate 45 produces the H level output, which clears the counter 42, returning the address to the address 0. As shown in FIG. 9a, ROM 43 stores data representing a start level or the ground level or zero volt at the address 0. It is to be noted that while a linear waveform is shown in each of FIGS. 9a and 9b, in actuality, the level changes stepwise in 66 sections which divide the respective "0" and "1" interval. It is also to be understood that level data may be chosen so that the envelope is shaped like a sinusoidal wave as shown in FIG. 5a. Data read from the ROM 43 is converted into an analog voltage by the D/A converter 44 before it is applied to a recording amplifier which is contained in the analog magnetic recording and reproducing apparatus 50.

Figure 10:
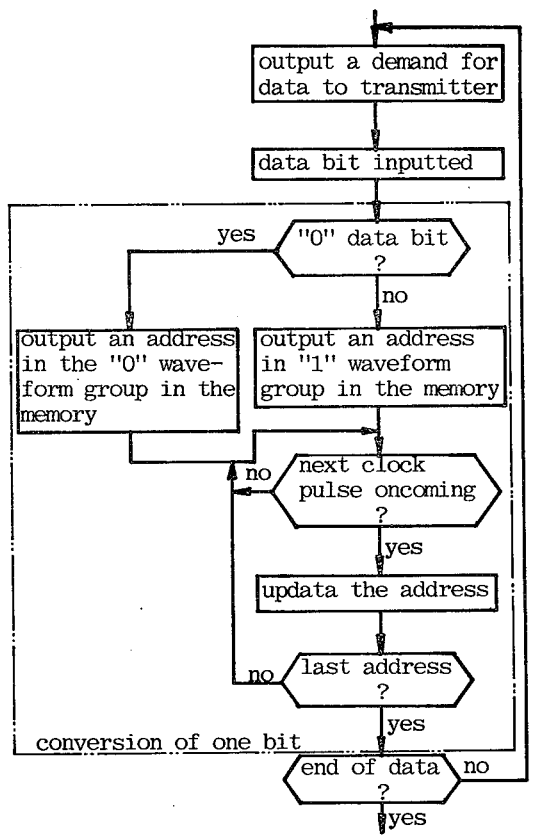
FIG. 10 is a flow chart of a waveform converting operation by a microcomputer according to a modification of the embodiment shown in FIG. 8.

It should be noted that part or all of the waveform generator 40 may be incorporated into the microcomputer 13. In a modification, at least the counter 42, NOR gate 45 and AND gate 46 may be incorporated into the microcomputer, and the resulting control of generating the waveforms is illustrated by the flow chart of FIG. 10. The conversion of one bit in this instance takes place in a similar manner as the conversion by using the waveform generator shown in FIG. 8, and the counting program updates the address at which data is to be read from the ROM. The entire flow chart shown in FIG. 10 forms part of an operation sequence performed by the microcomputer, and the microcomputer itself is utilized as the waveform generator. Where a microprocessor chip including a D/A converter is utilized as the data processing unit 10, the D/A converter 44 shown may be omitted.

Figure 11A:
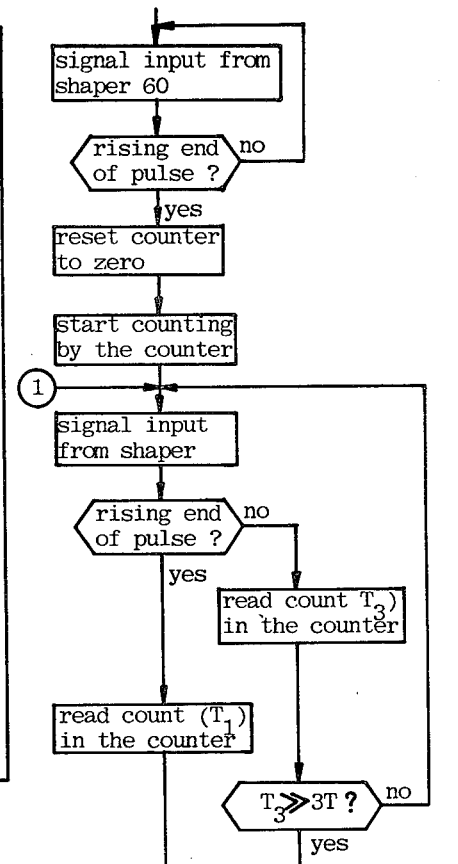
FIGS. 11a and 11b are flow charts illustrating a reproduced signal reading operation by the microcomputer shown in FIG. 8.
Figure 11B:
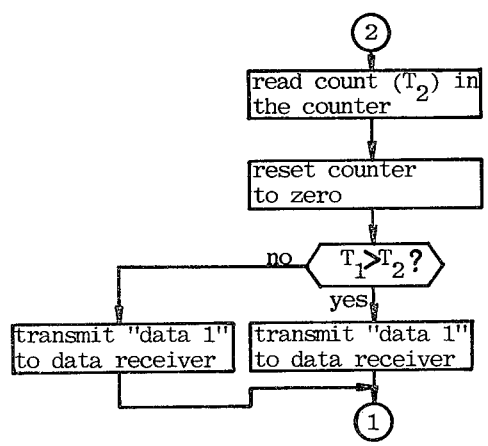

Referring to FIGS. 11a and 11b, there are shown flow charts illustrating a reading operation for a reproduced signal. The microcomputer 13 enables the apparatus 50 for a read operation, and waits for a leading edge (L→H) in the output therefrom. In response to such leading edge, the microcomputer enables the counter 42 for an up-counting operation (CLEAR=0), and waits for the read signal to change from H to L and then from L to H. In response to the second inversion from the L to the H level, the prevailing count code ($T_1$) is read, and the counter 42 is momentarily cleared (CLEAR=1), and thereafter the microcomputer waits for the read signal to change from H to L and then from L to H. In response to the second inversion, the microcomputer reads the prevailing count code ($T_2$), and clears the counter 42. It then compares $T_1$ and $T_2$ against each other, and if $T_1 > T_2$, it determines the presence of "1" bit, and applies a high level to the output port connected to the data receiver 30, and conversely if $T_1 < T_2$, it applies an L level to the output, supplying a read command pulse to the receiver 30. The microcomputer compares the count code against 3T during the time it waits for an inversion in the read signal, and if the count code should exceed 3T, it proceeds to the processing of an abnormal condition since the maximum count in a normal reading operation is equal to 2T.

As discussed above, in accordance with the invention, an analog magnetic recording which enables the signal reproduction in a manner to permit the determination of a binary signal is accomplished with a relatively simple arrangement. Since the data processing unit can also be used for the processing of a recording signal, the number of added components is minimized, thus permitting a compact and inexpensive analog magnetic recording and reproducing apparatus to be used for the recording, and if required for the reproduction of binary data.

What we claim is:

1. An analog magnetic recording system comprising:
   an analog magnetic recording apparatus including a combination of an amplifier and an associated recording head which permits an analog signal recording to be made on a magnetic record medium;
   and a digital electronic processing unit assigning to each of one or the other of binary data bits a pulse or pulses each having a duty cycle of substantially 50%, the processing unit operating to produce an analog signal which initiates a gradual increase in its level at a point of transition from one of the levels to the other of the pulse or each pulse and returns to a start level at a point of transition from the other to the one level and initiates a gradual decrease in its level, the analog signal produced being supplied to the analog magnetic recording apparatus;
   wherein the digital electronic processing unit assigns to each of the one or the other of binary data bits a shorter pulse having a duty cycle of substantially 50% and a longer pulse having a duty cycle of substantially 50%.

2. An analog magnetic recording system according to claim 1 in which the digital electronic processing unit assigns to one of the binary data bits a time sequence of the shorter pulse and the longer pulse, and assigns to the other data bit a time sequence of the longer pulse and the shorter pulse.

3. An analog magnetic recording system according to claim 1 in which both the shorter and the longer pulse each comprise a single period.

4. An analog magnetic recording system according to claim 1 in which the shorter pulse assigned to one of the binary data bits has a duty cycle and a period, each of which is equal to the duty cycle and the period of the shorter pulse assigned to the other data bit, and in which the longer pulse assigned to said one of the binary data bits has a duty cycle and a period, each of which is equal to the duty cycle and the period of the longer pulse assigned to the other data bit.

5. An analog magnetic recording system according to claim 1 in which the longer pulse has a period which is an integral multiple of the period of the shorter pulse.

6. An analog magnetic recording system according to claim 1 in which the digital electronic processing unit comprises a read only memory storing level data for a recording signal, a counter for supplying an address at which the read only memory is to be read out, a pulse oscillator, and a microprocessor for applying a signal to the read only memory which indicates a particular group to be read out in accordance with the status of data bit to be recorded and for controlling a counting operation by the counter.

7. An analog magnetic recording system comprising:
   an analog magnetic recording apparatus including a combination of an amplifier and an associated recording head which permits an analog signal recording on a magnetic record medium,
   and a digital electronic processing unit assigning to one of binary data bits a time sequence of a shorter pulse of a single period and having a duty cycle of substantially 50% and a longer pulse of a single period and having a duty cycle of substantially 50%, and assigning the other data bit a time sequence of a longer pulse of a single period which is identical to the longer pulse assigned to said one data bit and a shorter pulse of a single period which is identical to the shorter pulse assigned to said one data bit, the processing unit producing an analog signal which is formed by initiating a gradual increase in its level at a point of transition from one of the levels to the other of such pulses and returning to a start level at a point of transition from said other to said one level and initiating a gradual decrease in its level, the analog signal produced being supplied to the analog magnetic recording apparatus.

8. An analog magnetic recording system according to claim 7 in which a gradual increase or a gradual decrease in the level represents a linear function of time.

9. An analog magnetic recording system according to claim 7 in which a gradual increase or a gradual decrease in the level represents a sinusoidal function of time.

10. An analog magnetic recording system according to claim 7 in which the digital electronic processing unit comprises a read only memory storing level data for a recording signal, a counter supplying an address at which the read only memory is to be read out, a pulse oscillator and a microprocessor for supplying a signal to the read only memory which indicates a particular group to be read out in accordance with the status of data bit to be recorded and for controlling a counting operation by the counter.

* * * * *